Jan. 14, 1941.  G. C. R. KUIPER  2,228,631
BRAKE
Original Filed Aug. 29, 1936   3 Sheets-Sheet 1
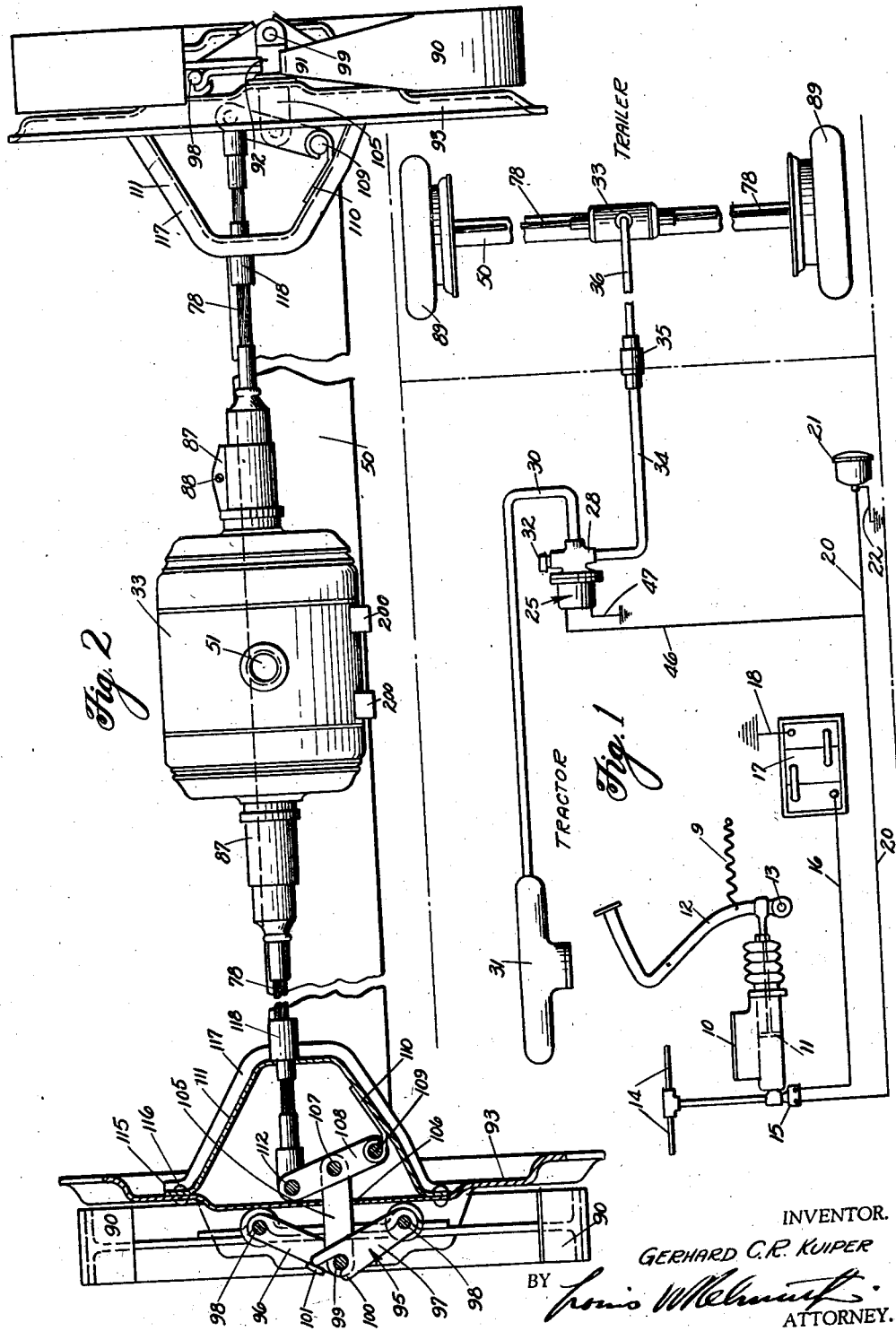
INVENTOR.
GERHARD C.R. KUIPER
BY
ATTORNEY.

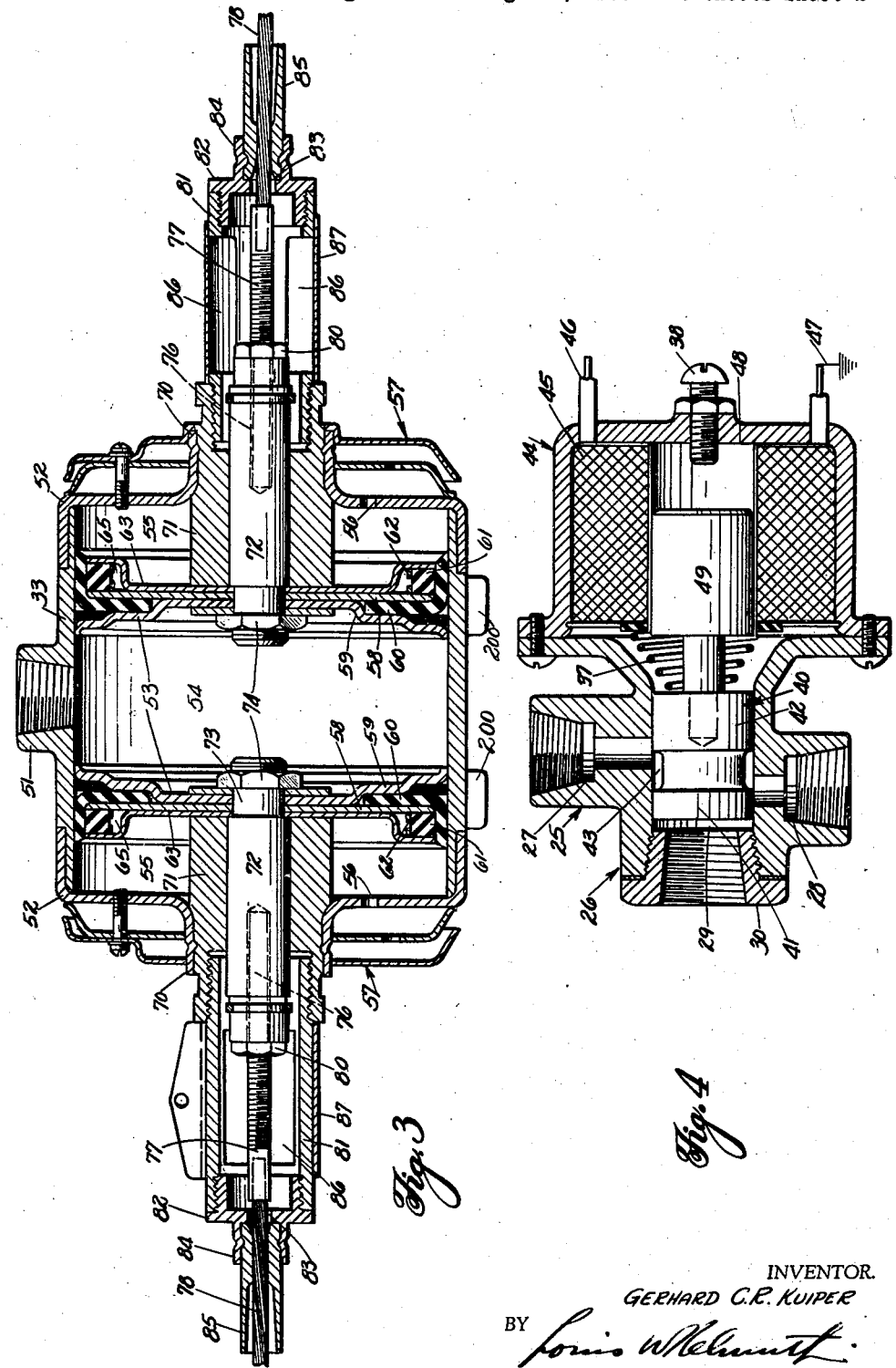

Jan. 14, 1941.　　　G. C. R. KUIPER　　　2,228,631
BRAKE
Original Filed Aug. 29, 1936　　3 Sheets-Sheet 3
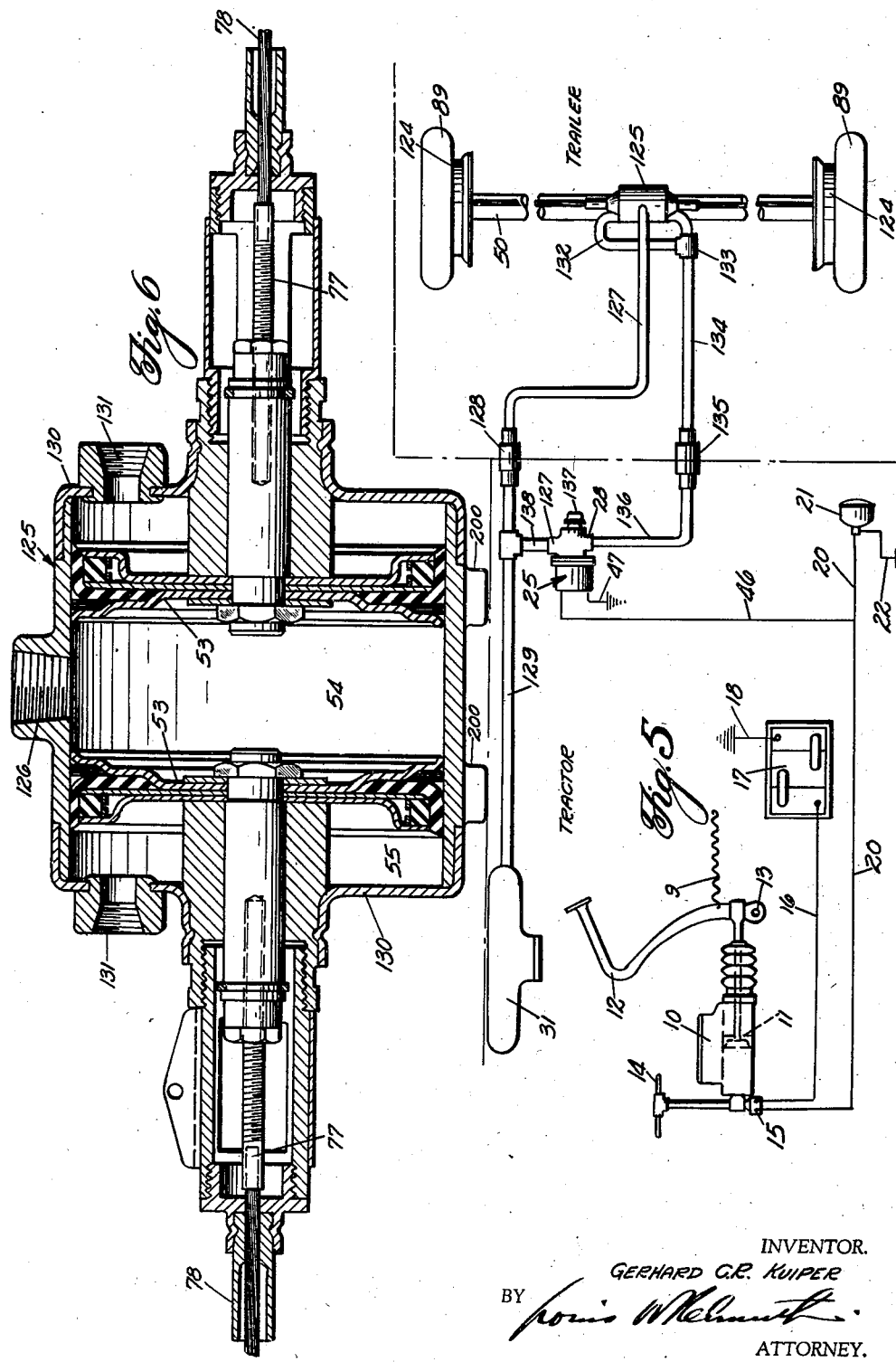
INVENTOR.
GERHARD C.R. KUIPER
BY
ATTORNEY.

Patented Jan. 14, 1941

2,228,631

UNITED STATES PATENT OFFICE 2,228,631

BRAKE

Gerhard C. R. Kuiper, Wiesbaden, Germany, assignor to The Midland Steel Products Company, Cleveland, Ohio, a corporation of Ohio Original application August 29, 1936, Serial No. 98,550. Divided and this application February 10, 1939, Serial No. 255,678

8 Claims. (Cl. 188—3)

This application is a division of my copending application for Brakes, Serial No. 98,550 filed August 29, 1936, issued Oct. 3, 1939 as Patent No. 2,174,921 and relates to new and useful improvements in vehicle brakes and an object of the invention is to provide a brake system controlled by the energization and de-energization of the stop signal lamp circuit of the vehicle.

Another object of the invention is to provide a brake system including hydraulic brakes and vacuum brakes, the latter being controlled by the vehicle stop signal circuit actuated by the hydraulic brake mechanism.

Another object is to provide a housing mounted on the brake apron for pivotally supporting a lever connected to the center pin of a toggle brake mechanism and to the brake operating cable supported by the housing normal to the brake drum.

Other objects and advantages of the invention will become apparent during the course of the following description.

In the accompanying drawings forming a part of the description and wherein like numerals are employed to designate like parts throughout the several views.

Fig. 1 is a layout of one embodiment of the invention,

Fig. 2 is a sectional view partly in elevation of the brake cables and power cylinder hookup supported on the axle of the vehicle, Fig. 3 is a sectional view of the power cylinder for moving the brake cables, Fig. 4 is a sectional view of the control valve mechanism, Fig. 5 is a layout of another embodiment of the invention, Fig. 6 is a sectional view of a modified form of power cylinder.

Referring to Figs. 1 through 4, the numeral 10 designates a hydraulic master cylinder provided with a piston 11 actuated by a brake pedal 12 fulcrumed at 13 and held in brake release position by a retractor spring 9, and the cylinder 10 is connected to conduits 14 not completely shown which in this instance lead to the wheel brake cylinders of the tractor.

The tractor is provided with an electric stop signal circuit controlled by the pressure developed in the master cylinder and comprises a pressure switch 15 communicating with the pressure side of the master cylinder and has one contact connected by a conductor 16 to an electric battery 17 grounded at 18, and the other contact is connected by a conductor 20 to a stop signal lamp 21 grounded at 22. When the brake pedal 12 is depressed the pressure switch 15 is closed to energize the stop signal circuit and light the stop lamp 21 to indicate that the tractor brakes are applied.

The stop signal circuit is employed to operate an electric magnetic valve 25 which controls the apparatus for operating the trailer brakes. The control valve is shown in detail in Fig. 4 and comprises a housing 26 having transverse ports 27 and 28 communicating with an axial bore 29 connected to a conduit 30 leading to the manifold 31 of the tractor engine for the source of suction. The transverse port 27 is provided with an air breather 32 exposed to the atmosphere, and the transverse port 28 communicates with a power cylinder 33 on the trailer by means of a conduit 34, coupling 35 and conduit 36. Reciprocally mounted in the bore 29 is a valve 40 having spaced annular closure or valve members 41 and 42 which define an annular recess 43 therebetween to connect the power cylinder port 28 with the atmosphere port 27 when the valve is in brake release position shown in Fig. 4.

The electro magnetic means for operating the valve 40 is enclosed in a housing 44 bolted to the housing of the valve 40 and comprises a solenoid having an annular coil 45 connected to the stop light signal circuit through a conductor 46 and is grounded as indicated at 47. Reciprocally mounted in the bore 48 of the coil 45 is an iron plunger or core 49 connected to the valve 40 which is normally urged to brake release position by means of a spring 37 interposed between the valve 40 and the coil 45. An adjusting screw 38 is carried by the coil housing 44 and is adapted to be adjusted to alter the travel of the valve 40 inwardly of the coil 45.

The power cylinder 33 is mounted on the axle 50 of the trailer by means of a bracket 200 and is provided with a port 51 connected to the conduit 36 and has its both ends closed by end plates 52. Reciprocally mounted in the power or brake cylinder 33 are a pair of pistons 53 spaced apart to define a chamber 54 exposed to the port 51, the pistons 53 are also spaced from the end plates 52 to define chambers 55 therebetween which communicate with the atmosphere through ports 56 in the end plates and a breather construction 57 mounted on the end plates 52. Each piston is composed of a pair of plates 58 and 59 having clamped between their margins a flexible piston cup 60 having its angularly disposed circumferential margin pressed into snug engagement with the interior cylindrical walls of the cylinder 33 by means of an annular retaining ring 61 and an expansible spring 62 which are prevented from displacement by a plate 63 provided with a marginal recess 65 to accommodate the annular retaining ring 61 and spring 62.

Each end plate 52 is provided with an outwardly extending boss 70 in which is fitted an elongated bearing 71 extending a substantial distance into the cylinder 33 for the air tight sliding reception of a piston rod 72 the inner end 73 of which is attached to the piston 53 by means of a nut 74. A brake cable adjusting device is attached to each piston rod 72 by providing each piston with an elongated axially disposed threaded bore 76 for the threaded reception of one end of a cable adjusting bolt 77 secured to a brake cable 78 extending to the trailer wheel brake mechanism. The length of each brake cable 78 is adjusted by threading the adjustable bolt 77 with respect to the piston rod 72 and is locked in adjusted position by means of a lock nut 80 adapted to be tightly threaded against the end of the piston rod 72.

A housing is provided to protect the brake cable adjusting device and comprises a sleeve 81 having the end threaded into the bearing 72 and the opposite end is closed by a cap 82 provided with an aperture 83 for the loose reception of the brake cable 78 and with a boss 84 to accommodate the end of the brake cable cover 85.

In order to provide easy access to the nut 80 for adjusting the brake cables 78, each sleeve 81 is provided with oppositely disposed elongated slots 86 for the easy insertion of a wrench to manipulate the nut 80. These openings 86 are covered by flexible covers 87 removably arranged about the sleeves 81 by means of a nut and bolt connection 88.

Each trailer wheel brake mechanism includes an internal expanding brake shoe 90 having separable ends 91 and an anchor pin 92 mounted on an apron 93 which closes the open face of a brake drum not shown attached to the trailer wheel 89. The toggle mechanism 95 for spreading each brake shoe comprises a pair of toggle arms 96 and 97 pivoted at their outer ends on thrust pins 98 arranged at both ends of each brake shoe. The inner ends of the toggle arms engage a common pivot 99, the inner end of the arm 96 being pivotally connected thereto and the male arm 97 having its inner end bifurcated to permit of both pivotal and sliding connection. In order to prevent the toggle from being pulled over dead center upon inward movement of the brake cable 78, the extreme end 100 of the male arm engages a connecting portion 101 of the female arm 96 and further inward movement of the toggle toward dead center changes the pivot point of the toggle from the axis of pin 99 to the point of contact between the end 100 of the male arm 97 and the connecting portion 101 of the female arm 96. The pivot pin 99 is engaged by one end of a link 106 extending through a suitable opening 106 in the apron 93 which is sufficiently elongated to permit the link 105 to float back and forth in accordance with the movement of the brake shoe. This link is pivotally connected at its other end by means of a pin 107 to a lever 108 intermediate the ends thereof. One end of the lever 108 is pivotally connected by a pin 109 to a bracket 110 rigidly secured to a housing 111 mounted on the apron 93. The other end of the lever 108 is attached to the flexible brake cable 78 by means of a yoke and pivot connection 112.

The housing 111 has an open side adjacent the apron 93 and is provided with a marginal flange 115 detachably secured to the apron 93 by means of bolts 116, whereby upon removal of the bolts the housing may conveniently be removed to permit access to the parts of the spreading mechanism enclosed and supported thereby. The central portion of each housing projects as at 117 toward the power cylinder 33 to accommodate a sleeve 118 in which is slidably disposed the flexible brake cable 78. It will be noted that each housing supports the flexible cable 78 normal to the apron 93, and that the power cylinder 33 is disposed in alignment with each brake cable whereby a straight pull will be exerted on the latter normal to the aprons 93 throughout the length of the brake cables 78.

In order to operate the foregoing embodiment assume that the brakes are in release position whereby the stop signal circuit is de-energized and the spring 37 holds the valve in the release position shown in Fig. 4. Under these conditions the piston 53 in the power cylinder 33 will be suspended in atmosphere since the chambers 55 are at all times exposed to atmosphere, and the chamber 54 is exposed to atmosphere through the conduit 36, coupling 35, conduit 34, annular recess 43 in the valve 25, port 27, and breather 32. When it is desired to apply the brakes, pressure is exerted on the brake pedal 12 to move the hydraulic plunger 11 into the master cylinder 10 to exert pressure on and distribute the brake fluid through the conduits 14 to apply the tractor wheel brakes.

The initial pressure developed in the master cylinder upon braking movement of the brake pedal 12 operates the pressure switch 15 to close the contacts thereby energizing the stop signal circuit to light the signal lamp 21 and thus indicate that the brakes are being applied.

Energization of the stop signal circuit causes energization of the coil 45 which attracts the iron core 49 to move the valve 40 to brake applied position. In this position the valve 40 connects the chamber 54 of the power cylinder 33 with the engine manifold through the conduit 30, bore 29, port 28, conduit 34, coupling 35 and the conduit 36. When this occurs the pistons 53 are subjected to a differential pressure which causes the pistons to move inwardly of the power cylinder 33 and pull the flexible brake cables 78 to actuate the brake toggle mechanisms and apply the trailer brakes.

As to the operation of the toggle mechanisms the straight pull on the flexible cables causes the levers 108 to pivot about the points 109 and tends to pull the links 105 outwardly through the slots 106 to flatten the toggles and spread the brake shoes 90 into engagement with the drums to apply the trailer brakes.

In order to release the tractor and trailer brakes, pressure is removed from the brake pedal which removes the pressure from the fluid operated tractor brakes and opens the contacts of the pressure switch 15 to de-energize the stop signal circuit which in turn de-energizes the solenoid control valve 25, the spring 37 moving the valve 40 to brake release position to again bring the power cylinder chamber 54 in communication with the atmosphere whereby the pistons 53 are no longer subjected to differential pressure and tension on the brake cables 78 is released, so that the springs, not shown, in the trailer wheel brakes return the brake shoes 90 to idle position thus collapsing the toggles and returning the brake cables 78 to brake release position.

Another embodiment of the invention is illustrated in Figs. 5 and 6 and is similar to the foregoing construction except that trailer power cylinder is suspended in vacuum when the brakes are in release position. In this embodiment of the invention the power cylinder 125 is also carried by the axle 50 of the trailer and is in alignment with the trailer wheel brakes 124 so as to effect a straight pull on the brake cables 78 from the wheel brakes to the power cylinder. The power cylinder is provided with a port 126 connected to a conduit 127 extending to a coupling 128 coupled to a conduit 129 leading to the manifold 31. The ends of the power cylinder 125 are closed by end plates 130 provided with ports 131 communicating with each other exteriorly of the power cylinder by means of a conduit 132 connected by a T connection 133 to a conduit 134 extending to a coupling 135 coupled to a conduit 136 leading in this instance to the port 28 of the control valve 25. In this construction the valve bore 29 communicates with the atmosphere through a breather 137, and the valve port 27 is connected to a conduit 138 joined to the conduit 129 and thus to the manifold 31.

In order to operate this embodiment of the invention, assume that the brakes are in release position. Under these conditions the pistons 53 will be suspended in vacuum since the chamber 54 is connected to the manifold through the port 126, conduit 127, coupling 128, and conduit 129 to the manifold 31, and the chambers 55 at the other side of the pistons 53 communicate with the manifold through the ports 131, conduits 132 and 134, coupling 135, conduit 136, valve port 28, recess 43 in the valve 40, port 27 and conduits 138 and 129 to the manifold 31. To apply the brakes, pressure is exerted on the brake pedal 12 to distribute liquid under pressure through the conduits 14 to apply the tractor wheel brakes, and also to close the pressure switch 15 which energizes the stop signal circuit and the coil 45 in the control valve 25 to attract the core 49 and move the valve 40 to brake applied position. In this position the valve 40 interrupts communication between the valve ports 27 and 28 and thus communication between manifold 31 and the end chambers 55 of the power cylinder 125, the latter being exposed to atmosphere through the ports 131, conduits 132 and 134, coupling 135, valve port 28, bore 29 and breather 137. The pistons 53 are now subjected to a differential pressure of vacuum in the chamber 54 and atmosphere in the chambers 55 which causes the pistons 53 to move inwardly of the power cylinder 125 and to exert a straight pull on the brake cables throughout their length to flatten out the toggle mechanism in the manner hereinbefore described to effect braking of the trailer brakes.

When it is desired to release the brakes, pressure is removed from the brake pedal 9 to release the tractor brakes and open the pressure switch 15 which de-energizes the coil 45 of the control valve 25, the valve spring 37 moving the valve 40 to brake release position to expose the end chambers 55 of the power cylinder 125 to suction in the manifold 31 suspending the pistons 53 in vacuum whereby the springs, not shown in the trailer brakes, will exert a pull on the brake cables 78 to move the pistons 53 outwardly with respect to the power cylinder 125 to their brake release position.

It will be understood that various changes in the construction and arrangement of parts may be resorted to without departing from the scope of the appended claims.

I claim:

1. In a vehicle having a brake, a source of suction, a power cylinder, a differential power piston in the power cylinder and operatively connected to the brake, a valve controlling communication of said cylinder with said source of suction, electrically operated means for operating said valve to establish differential pressure upon opposite sides of said piston for effecting power movement of the piston, and a stop signal circuit for controlling said electrically operated means.

2. In a vehicle having a brake, a stop signal circuit including a stop signal lamp, power means for operating the vehicle brake, and electro-magnetic means connected to said stop signal circuit and rendered operative upon energization of said stop signal circuit to cause operation of said power means to operate said brake.

3. In an automotive vehicle brake system, an electric circuit and a switch for opening and closing said circuit, a stop signal lamp in said circuit, a brake pedal for closing said switch upon depression of said pedal to brake applying position to energize said circuit and light said signal lamp, a brake for said vehicle, means for operating said brake, and electro-magnetic means connected to said circuit and energized upon energization of said circuit to operate said brake operating means to thereby apply said brake.

4. In a tractor-trailer brake system, a hydraulically operated brake for said tractor, a power operated brake for said trailer, a stop signal circuit including a pressure operated switch, a stop signal lamp in said circuit, operator operated means for developing hydraulic pressure to apply said hydraulically operated brake and close said pressure operated switch to energize said circuit and light said signal lamp, and electro-magnetic means connected to said stop signal circuit energized upon energization of said stop signal circuit to effect operation of said power brakes on said trailer.

5. In an automotive vehicle brake system, an electric stop signal lamp circuit and a switch therein, a stop signal lamp in said circuit, a brake pedal movable to brake applying position for closing said switch thereby energizing said stop signal circuit to light said signal lamp, a brake for said vehicle, a power cylinder, piston means in said power cylinder and connected to said brake, valve means for establishing differential air pressures on the opposite sides of said piston means to operate said brake, and electro magnetic means connected to said stop signal circuit and energized upon energization of said circuit to operate said valve means and thereby apply said brake by said differential pressure.

6. In an automotive vehicle brake system, a hydraulically operated brake for said vehicle, a hydraulic cylinder connected in said hydraulic brakes, a piston therein, operator operated means for applying pressure to said piston for the operation of said hydraulic brakes, a stop signal circuit, a stop signal lamp in said circuit, a pressure switch operated by the pressure developed in said cylinder during braking of said hydraulic brakes to energize said circuit to light said signal lamp, a mechanical brake for said vehicle, a power cylinder, piston means in said power cylinder connected to said mechanical brake, valve means for establishing differential pressure on the opposite sides of said piston means to operate said mechanical brakes, and electro-magnetic means connected to said stop signal circuit and energized upon energization of said circuit to operate said valve means and effect power operation of said mechanical brake.

7. In an automotive vehicle brake system, a brake, a power cylinder and piston to operate said brake, an electrically operated valve for controlling the operation of said piston, an electrically operated signal, and a stop signal circuit for controlling the operation of said signal and said electrically operated valve to cause actuation of said brake upon operation of said signal.

8. In a vehicle having a signal and a brake, a power cylinder with a pressure operated piston therein for operating said brake, a valve for controlling pressure to said piston, and means connecting the signal and the valve for operating the valve upon operation of the signal to admit pressure to said piston for power operating said brake.

GERHARD C. R. KUIPER.